US012547636B2

United States Patent
Jiang et al.

(10) Patent No.: US 12,547,636 B2
(45) Date of Patent: Feb. 10, 2026

(54) METHOD, APPARATUS, DEVICE, AND STORAGE MEDIUM FOR PROMPT DETERMINATION

(71) Applicant: Beijing Zitiao Network Technology Co., Ltd., Beijing (CN)

(72) Inventors: Xiang Jiang, Beijing (CN); Han Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/053,198

(22) Filed: Feb. 13, 2025

(65) Prior Publication Data

US 2025/0335453 A1 Oct. 30, 2025

Related U.S. Application Data

(63) Continuation of application No. PCT/CN2024/089893, filed on Apr. 25, 2024.

(51) Int. Cl.
*G06F 16/248* (2019.01)
*G06F 16/242* (2019.01)

(52) U.S. Cl.
CPC .......... *G06F 16/248* (2019.01); *G06F 16/242* (2019.01)

(58) Field of Classification Search
CPC .............................. G06F 16/248; G06F 16/242
See application file for complete search history.

(56) References Cited

U.S. PATENT DOCUMENTS

| 8,170,897 | B1* | 5/2012 | Cohen ............... G06Q 10/06311 |
| | | | 705/7.13 |
| 10,678,402 | B1 | 6/2020 | Parande |
| 11,086,894 | B1* | 8/2021 | Srivastava .......... G06F 16/2282 |
| 11,922,541 | B1 | 3/2024 | Parasnis et al. |
| 11,928,426 | B1* | 3/2024 | Gutzeit ................. H04L 51/02 |
| 2022/0035661 | A1* | 2/2022 | Bahrami ................. G06F 21/00 |

(Continued)

FOREIGN PATENT DOCUMENTS

CN 116956858 A 10/2023
CN 117032515 A 11/2023

(Continued)

OTHER PUBLICATIONS

ISA China National Intellectual Property Administration, International Search Report Issued in Application No. PCT/ CN2024/ 089893, Jan. 11, 2025, 6 pages.

(Continued)

*Primary Examiner* — Toan H Vu
(74) *Attorney, Agent, or Firm* — Alleman Hall LLP

(57) ABSTRACT

According to embodiments of the disclosure, a method, an apparatus, a device, and a storage medium for prompt determination are provided. The method includes: presenting, in response to receiving a first interaction request for specifying a type of a task to be performed, an interaction area matching the type, the interaction area including: a data input box for inputting data to be processed; and a prompt template matching the type, the prompt template specifying a plurality of attributes of a prompt for performing the task; and generating, in response to receiving a second interaction request for the interaction area, the prompt for performing the task.

20 Claims, 6 Drawing Sheets

(56) References Cited

U.S. PATENT DOCUMENTS

2023/0315856 A1* 10/2023 Lee .......................... G06N 3/08
2024/0205332 A1*  6/2024 Tzur ................... H04M 3/5166
2024/0320629 A1*  9/2024 Bespalov .............. G06F 40/279
2024/0378530 A1* 11/2024 Chakravarthi .......... G06F 3/011

FOREIGN PATENT DOCUMENTS

| CN | 117312521 A | 12/2023 |
| CN | 117392254 A | 1/2024 |
| CN | 117475031 A | 1/2024 |
| CN | 117671067 A | 3/2024 |

OTHER PUBLICATIONS

European Patent Office, Extended European Search Report Issued in Application No. 24850253.6, Sep. 4, 2025, Germany, 9 pages.

* cited by examiner

METHOD, APPARATUS, DEVICE, AND STORAGE MEDIUM FOR PROMPT DETERMINATION

CROSS-REFERENCE

This application is a continuation of International Patent Application No. PCT/CN2024/089893, filed on Apr. 25, 2024, and entitled "METHOD, APPARATUS, DEVICE, AND STORAGE MEDIUM FOR PROMPT DETERMINATION", the entirety of which is incorporated herein by reference.

FIELD

Example embodiments of the present disclosure generally relate to prompt management, and more particularly, to a method, an apparatus, a device, and a computer-readable storage medium for prompt determination.

BACKGROUND

With the development of information technologies, various terminal devices may provide various services to people in the aspects of work, life, and the like. An application providing a service may be deployed in the terminal device. The terminal device presents the corresponding content through the user interface of the application, realizes interaction with the user, and meets various requirements of the user. In some cases, the application may utilize a model to perform a task. The application may, for example, determine a prompt to be provided to the model based on interactions with the user. The application may provide the determined prompt to the model so that the model outputs a response to the prompt. The application may obtain the response output by the model and provide the response to the user. The quality of the prompt will directly affect the quality of the response generated by the model. Therefore, how to improve the quality of the prompt is a problem concerned by people.

SUMMARY

In a first aspect of the present disclosure, a method for prompt determination is provided. The method includes: presenting, in response to receiving a first interaction request for specifying a type of a task to be performed, an interaction area matching the type, the interaction area including: a data input box for inputting data to be processed; and a prompt template matching the type, the prompt template specifying a plurality of attributes of a prompt for performing the task; and generating, in response to receiving a second interaction request for the interaction area, the prompt for performing the task.

In a second aspect of the present disclosure, an apparatus for prompt determination is provided. The apparatus includes: an interaction area presenting module configured to present, in response to receiving a first interaction request for specifying a type of a task to be performed, an interaction area matching the type, the interaction area including: a data input box for inputting data to be processed; and a prompt template matching the type, the prompt template specifying a plurality of attributes of a prompt for performing the task; and a prompt generating module configured to generate the prompt for performing the task in response to receiving a second interaction request for the interaction area.

In a third aspect of the present disclosure, an electronic device is provided. The device includes at least one processor; and at least one memory coupled to the at least one processor and storing instructions for execution by the at least one processor. The instructions, when executed by the at least one processor, cause the device to perform the method of the first aspect of the present disclosure.

In a fourth aspect of the present disclosure, a computer-readable storage medium is provided. The computer-readable storage medium has stored thereon a computer program, and the computer program is executable by a processor to implement the method according to the first aspect of the present disclosure.

In a fifth aspect of the present disclosure, there is provided a computer program product, including a computer program, wherein the computer program, when executed by a processor, implements the method according to the first aspect of the present disclosure.

It should be understood that the content described in this content section is not intended to limit the key features or important features of the embodiments of the present disclosure, nor is it intended to limit the scope of the present disclosure. Other features of the present disclosure will become readily understood from the following description.

BRIEF DESCRIPTION OF DRAWINGS

The above and other features, advantages, and aspects of various embodiments of the present disclosure will become more apparent from the following detailed description taken in conjunction with the accompanying drawings. In the drawings, the same or similar reference numbers refer to the same or similar elements, wherein.

DETAILED DESCRIPTION

Figure 1:
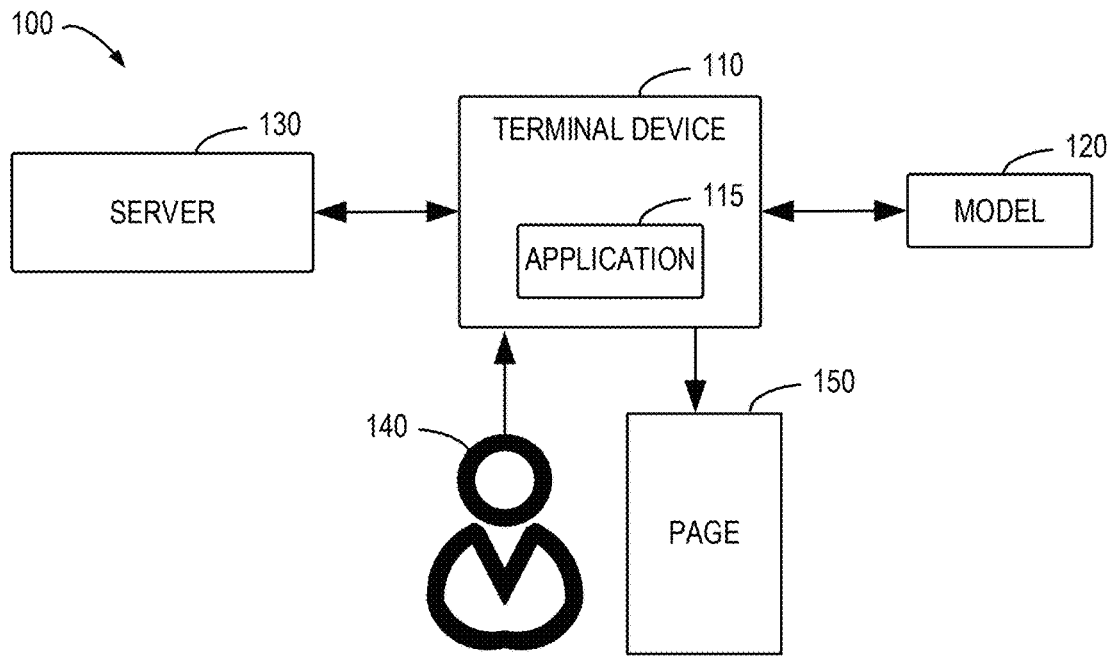
FIG. 1 illustrates a schematic diagram of an example environment in which embodiments of the present disclosure can be implemented.

Embodiments of the present disclosure will be described in more detail below with reference to the accompanying drawings. Although certain embodiments of the present disclosure are shown in the accompanying drawings, it should be understood that the present disclosure may be implemented in various forms, and should not be construed as limited to the embodiments set forth herein, but rather, these embodiments are provided for a more thorough and complete understanding of the present disclosure. It should be understood that the drawings and embodiments of the present disclosure are only for illustrative purposes and are not intended to limit the scope of the present disclosure.

In the description of the embodiments of the present disclosure, the terms "including" and the like should be understood as open-ended including, that is, "including but not limited to". The term "based on" should be understood as "based at least in part on". The terms "one embodiment" or "the embodiment" should be understood as "at least one embodiment". The term "some embodiments" should be understood as "at least some embodiments". Other explicit and implicit definitions may also be included below.

Herein, unless explicitly stated otherwise, "performing a step responding to A" does not mean that the step is performed immediately after "A", but one or more intermediate steps may be included.

It may be understood that the data involved in the technical solution (including but not limited to the data itself, the obtaining or use of the data) should comply with the requirements of the corresponding legal regulations and related provisions.

It can be understood that, before the technical solutions disclosed in the embodiments of the present disclosure are used, a user should be notified of the type of the personal information, the usage scope, the usage scenario, and the like related to the present disclosure and the authorization of the user should be obtained in an appropriate manner according to the relevant legal regulations.

For example, in response to receiving an active request from a user, prompt information is sent to the user to explicitly prompt the user that an operation requested by the user to be executed will need to acquire and use personal information of the user. Therefore, the user can autonomously select, according to the prompt information, whether to provide personal information to software or hardware such as an electronic device, an application, a server, or a storage medium that executes executing the operation of the technical solution of the present disclosure.

As an optional but non-limiting implementation, in response to receiving an active request of the user, a manner of sending prompt information to the user may be, for example, a pop-up window manner, and the prompt information may be presented in a text manner in the pop-up window. In addition, the pop-up window may further carry a selection control for the user to select "agree" or "disagree" to provide personal information to the electronic device.

It may be understood that the foregoing notification and the process of obtaining a user's authorization are merely illustrative, which do not limit the implementation of the present disclosure, and other manners meeting relevant legal regulations may also be applied to implementation of the present disclosure.

As used herein, the term "model" may learn associations between the corresponding inputs and outputs from training data, so that a corresponding output may be generated for a given input after training is completed. The generation of the model may be based on machine learning techniques. Deep learning is a machine learning algorithm that processes an input and provides a corresponding output by using a multi-layer processor. The neural network model is an example of a deep learning-based model. As used herein, "model" may also be referred to as a "machine learning model," a "learning model," a "machine learning network," or a "learning network," which terms are used interchangeably herein.

A "neural network" is a deep learning-based machine learning network. The neural network is capable of processing inputs and providing corresponding outputs, and typically include an input layer, an output layer, and one or more hidden layers between the input layer and the output layer. Neural networks used in deep learning applications typically include many hidden layers, thereby increasing the depth of the network. Layers of the neural network are connected in sequence such that an output of a previous layer is provided as an input to a later layer, wherein the input layer receives the input of the neural network and the output of the output layer serves as the final output of the neural network. Each layer of the neural network includes one or more nodes (also referred to as processing nodes or neurons), and each node processes input from the previous layer.

Generally, machine learning may generally include three phases, i.e., a training phase, a testing phase, and an application phase (also referred to as an inference phase). At the training stage, a given model may be trained using a large amount of training data, continuous iterative updating the parameter values, until the model is able to obtain consistent inferences from the training data that satisfy desired objectives. By training, the model may be considered to be able to learn, from the training data, an association from input to output (also referred to as mapping of input to output). The parameter values of the trained model are determined. In the testing phase, the test inputs are applied to the trained model to test whether the model is able provide the correct output, thereby determining the performance of the model. The testing phase may sometimes be fused into the training phase. In the application or inference stage, the trained model may be used to process actual model inputs based on the parameter values obtained from training, to determine corresponding model outputs.

FIG. 1 illustrates a schematic diagram of an example environment 100 in which embodiments of the present disclosure can be implemented. The environment 100 relates to a terminal device 110. In this example environment 100, the terminal device 110 is installed with an application 115 (it may be understood that although only one application 115 is shown in the figure, there may be multiple applications 115 actually). The application 115 may be any suitable application that may provide a conversational service. The user 140 may interact with the application 115 via the terminal device 110 and/or an attachment device of the terminal device 110.

The application 115 may provide the conversational service for the user via the model 120. The model 120 may be deployed locally at the terminal device 110, or may be deployed in a further electronic device (for example, a server 130). The model 120 may be a machine learning model, a deep learning model, a learning model, a neural network, or the like. In some embodiments, the model may be based on a language model (LM). The language model are capable of question and answer capabilities by learning from a large amount of corpus. The model 120 may also be based on any other suitable model.

In environment 100 of FIG. 1, the terminal device 110 may present a page 150 of the application 115 in response to the application 115 being in an active state. The terminal device 110 may present the page 150 to user 140 based on the operation of the user 140, to output information to and/or receive information from user 140. The page 150 may be, for example, an interaction page. The terminal device 110 may receive user inputs from the user 140 via the page 150, and present, in page 150, a response for user input determined via the model 120.

In some embodiments, the terminal device 110 communicates with server 130 to enable provisioning of services to the application 115. The terminal device 110 may be any type of mobile terminal, fixed terminal, or portable terminal, including a mobile phone, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/camcorder, a positioning device, a television receiver, a radio broadcast receiver, an electronic book device, a gaming device, or any combination of the foregoing, including accessories and peripherals of these devices, or any combination thereof. In some embodiments, the terminal device 110 can also support any type of interface for the user (such as a "wearable" circuit, etc.). The server 130 may be various types of computing systems/servers capable of providing computing power, including, but not limited to, a mainframe, an edge computing node, a computing device in a cloud environment, and the like.

It should be understood that the structures and functions of the various elements in the environment 100 are described for exemplary purposes only and do not imply any limitation to the scope of the present disclosure.

As mentioned above, the application may, for example, determine a prompt to be provided to the model based on interactions with the user. The application may provide the determined prompt to the model so that the model outputs a response to the prompt. The application may obtain a response output by the model output and provide the response to the user. The quality of the prompt will directly affect the quality of the response generated by the model. Traditionally, the application tends to determine the prompt directly based on received user input. The quality of the prompt may be affected by the user input. If the user input is not accurate enough, the accuracy of the response generated by the model based on the prompt may be poor, which may not meet the expectations of the user. The user may need to adjust the user input multiple times to obtain a satisfactory response.

In view of this, according to embodiments of the present disclosure, an improved solution for prompt determination based on an enhanced input is provided. In summary, a prompt template may be provided to enhance the convenience of the user's prompt, thereby facilitating the user to refine the prompt from multiple aspects, thereby determining a prompt more conforming to the requirement of the user. According to the solution, in response to receiving a first interaction request for specifying a type of a task to be performed, an interaction area matching the type is presented. The interaction area includes a data input box for inputting data to be processed and a prompt template matching the type, and the prompt template specifies a plurality of attributes of a prompt for performing the task. In response to receiving a second interaction request for the interaction area, the prompt for performing the task is generated.

Therefore, the user can customize the prompt conveniently and quickly, the difficulty of inputting the prompt by the user is reduced, the quality of the generated prompt is improved, and the response quality is further improved. Some example embodiments of the present disclosure will be described in detail below with reference to examples of the accompanying drawings.

FIG. 2A to FIG. 2H illustrate schematic diagrams of example pages 200A to 200H (which may also be referred to simply as examples 200A to 200H) in accordance with some embodiments of the present disclosure. It should be understood that the pages shown in the drawings are merely examples, and that in fact, various page designs may be present. Various graphical elements in the page may have different arrangements and different visual representations, one or more elements in which may be omitted or replaced, and one or more other elements may also be present. Embodiments of the present disclosure are not limited in this regard.

The pages shown in examples 200A to 200H may be presented at the terminal device 110. For ease of discussion, the examples 200A to 200H will be described with reference to the environment 100 of FIG. 1. In the environment 100, the terminal device 110 presents an interaction page (e.g., page 150) of a conversational interaction application (e.g., application 115). The terminal device 110 may receive a user input from the user 140 via the page 150, and provide a response corresponding to the user input to the user 140 via the page 150.

Figure 2A:
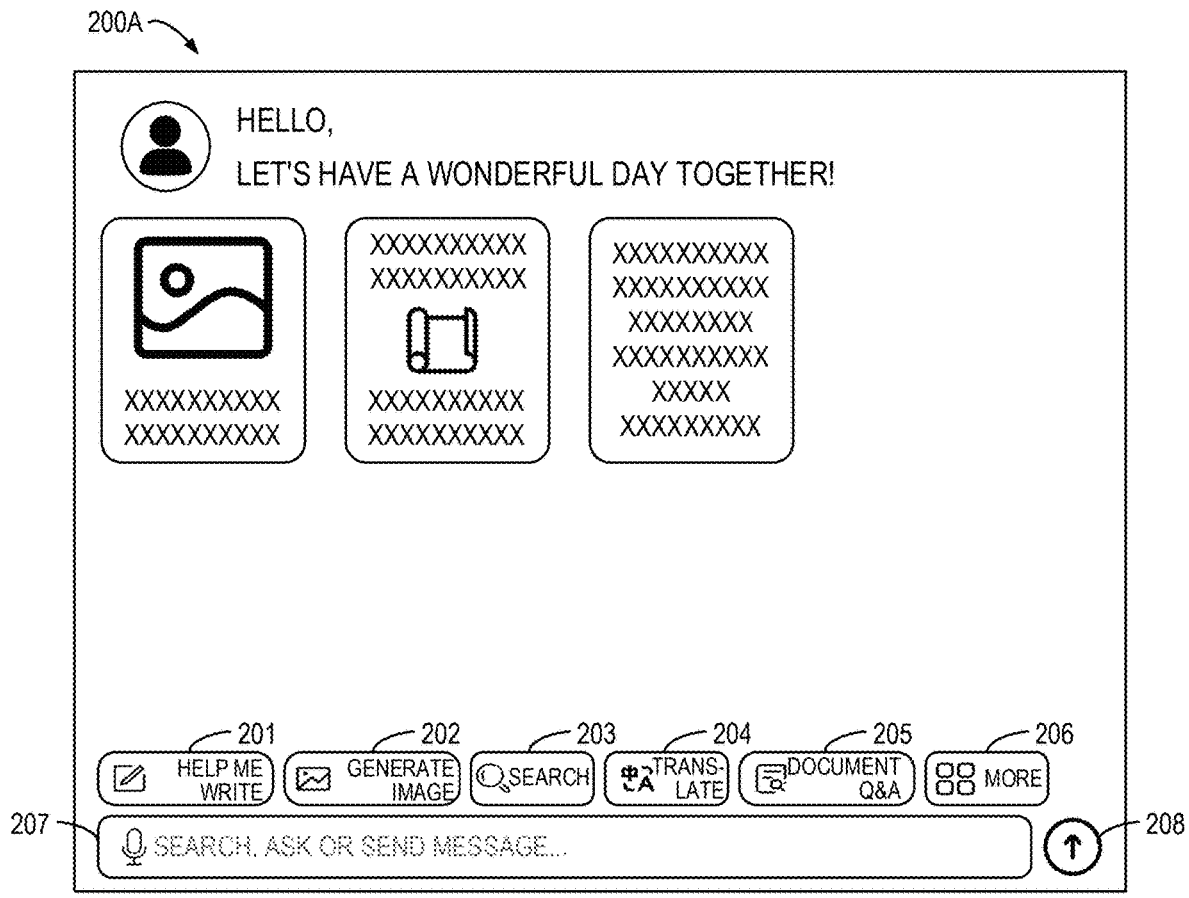
FIGS. 2A-2H illustrate schematic diagrams of example pages according to some embodiments of the present disclosure.

In some embodiments, the terminal device 110 may present, in the interaction page, at least one interaction control corresponding to the type of the predetermined at least one task. The terminal device 110 may, in response to receiving a trigger operation on a target interaction control, determine that a first interaction request for specifying a type of a task to be performed is received. As shown in FIG. 2A, the example 200A shows an example of an interaction page. Example 200A includes an input box 207. The terminal device 110 may receive user input via the input box 207. The user input may be any suitable type of input such as a text type, a speech type, an image type, or the like. Example 200A includes a send control 208. The terminal device 110 may, in response to receiving a user operation on the send control 208 (such as a trigger operation by the user for the send control 208), determine that the user input was received, and present the received user input as a session message from the user in example 200A.

The example 200A includes a plurality of interaction controls (e.g., interaction controls 201, 202, 203, 204, 205, etc.) corresponding to a plurality of predetermined types of tasks and an interaction control 206. The terminal device 110 may, in response to receiving a user operation for the interaction control 206, present more interaction controls (for example, if ten predetermined task types are included, the terminal device 110 may present five interaction controls corresponding to five predetermined task types in the example 200A, and the terminal device 110 may, in response to receiving the user operation for the interaction control 206, present five interaction controls corresponding to the remaining five predetermined task types). For example, the terminal device 110 may, in response to receiving the user operation on the interaction control 201, determine that a first interaction request for specifying a type of a task to be performed as "help me write" is received.

The terminal device 110 may present, in response to receiving a first interaction request for specifying a type of a task to be performed, an interaction area matching the type. The interaction area includes a data input box for inputting data to be processed and a prompt template matching the type. The prompt template may specify a plurality of attributes of a prompt for performing the task. In response to receiving a second interaction request for the interaction area, the terminal device 110 generates a prompt for performing the task. In this way, it may be convenient for the user to refine the plurality of attributes of the prompt, thereby obtaining the prompt that more matches the requirement of the user.

Here, the second interaction request may include an interaction request for the data input box and an interaction request for a target attribute of the plurality of attributes. In response to determining that the second interaction request is an interaction request for the data input box, the terminal device 110 may determine the data to be processed based on the second interaction request. In response to determining the second interaction request is an interaction request for the target attribute of the plurality of attributes, the terminal device 110 may set the attribute value of the target attribute based on the second interaction request. The terminal device 110 may generate the prompt based on the data and the attribute value.

Figure 2B:
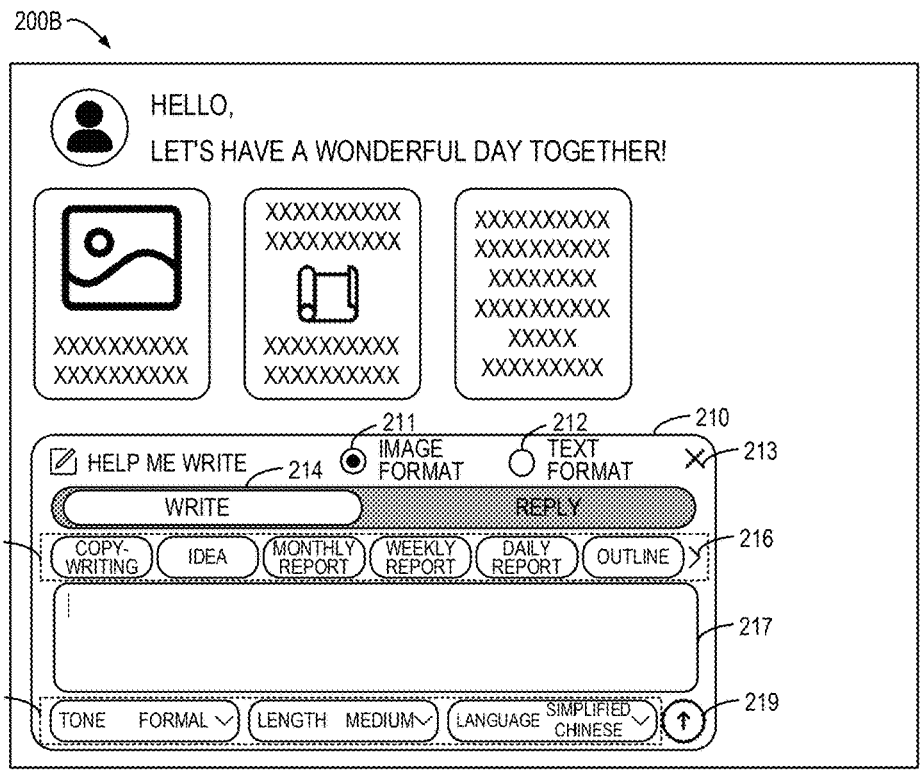
Figure 2C:
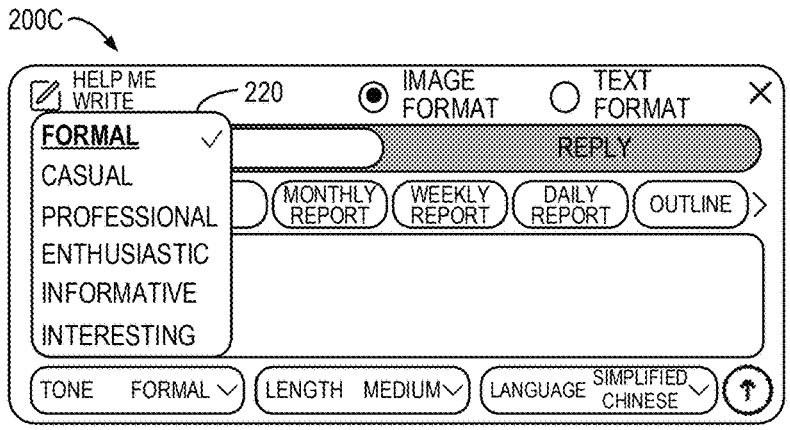

As shown in FIG. 2A and FIG. 2B, the terminal device 110 may, in response to receiving a user operation on the interaction control 201 in the example 200A, determine that a first interaction request for specifying a type of a task to be performed as "help me write" is received, and thus present the example 200B. Example 200B includes a cancel control 213. The terminal device 110 may cancel the presentation of the interaction area 210 in response to receiving the user operation on the cancel control 213. The terminal device 110 may, for example, present example 200B.

Example 200B includes an interaction area 210 that matches the type "help me write". The interaction area 210 includes a data input box 217 for inputting data to be processed. The terminal device 110 may, in response to determining that the second interaction request is an interaction request for the data input box 217, determine to-be-processed data based on the second interaction request. For example, the terminal device 110 may, in response to determining that the second interaction request is a text input request for the data input box, based on the text input request, determine the received text, and determine the received text as the to-be-processed data.

The interaction area 210 may also include, for example, a control 214, an area 215, and an area 218. For example, the terminal device 110 may determine the prompt template based on the control 214, the area 215, and the area 218, that is, determine a plurality of attributes of the prompt for performing the task based on the control 214, the area 215, and the area 218. The control 214 may be used to configure a function attribute of the prompt, which may include an option "write" and an option "reply", and each option corresponds to an attribute value of the function attribute. Taking the type of the task as "help me write" as an example, the terminal device 110 may, in response to the option "write" being selected, determine that the attribute value corresponding to the function attribute is "write", and the prompt may instruct the model to actively write a mail (and/or other types of documents). The terminal device 110 may, in response to the option "reply" being selected, determine that the attribute value corresponding to the function attribute is "reply", and the prompt may instruct the model to write a reply mail to other mails.

The area 215 may be used to configure category attributes of the prompt. The area 215 may include a plurality of options, such as an option "copywriting", an option "idea", an option "monthly report", an option "weekly report", an option "daily report", an option "outline", and an option "mail", and each of the options corresponds to an attribute value of the category attributes. Area 215 may include more controls 216, and terminal device 110 may present more options in response to receiving user operation on the more controls 216.

The area 218 may present a plurality of tags, each of which may correspond to an attribute. For example, area 218 may include a tag corresponding to a tone attribute, a tag corresponding to a length attribute, a tag corresponding to a language attribute, etc. The terminal device 110 may, in response to determining that the second interaction request is an interaction request for the target attribute, present a plurality of candidate attribute values associated with the target attribute, and in response to receiving a third interaction request for a target candidate attribute value of the plurality of candidate attribute values, set the attribute value by utilizing the target candidate attribute value.

For example, the terminal device 110 may, in response to receiving a trigger operation on the tag corresponding to the tone attribute, determine that the second interaction request is the interaction request for the tone attribute. The terminal device 110 may present the example 200C shown in FIG. 2C, and example 200C shows an example of an interaction area. Example 200C presents a menu 220 that includes a plurality of candidate attribute values associated with a tone attribute. The terminal device 110 may, in response to receiving a selection operation on the attribute value "formal" in the plurality of candidate attribute values, determine that a third interaction request for the attribute value "formal" is received, and set an attribute value of the tone attribute to be "formal". In this way, a desired candidate may be selected from a plurality of threshold candidates of attributes, thereby simplifying the complexity of user input.

Referring back to FIG. 2B, in example 200B, the terminal device 110 may, for example, determine the prompt template based on the operations on the configurations of the control 214, the area 215, and the area 218. For example, if the option "write" in the control 214 is selected, the option "copywriting" in the area 218 is selected, the attribute value of the tone attribute is "formal", the attribute value of the length attribute is "medium", and the attribute value of the language attribute is "Simplified Chinese", the terminal device 110 may determine that the prompt template includes text such as "write", "copywriting", "formal", "medium", "Simplified Chinese", and the like.

In some embodiments, the interaction area may further include a specifying control for specifying a presentation format of the interaction area. The terminal device 110 may, in response to receiving the user operation for the specifying control, determine that a fourth interaction request for the specifying control is received. For example, the terminal device 110 may, in response to receiving the fourth interaction request for the specifying control, present the interaction area by utilizing the presentation format specified by the fourth interaction request. As shown in FIG. 2B, the interaction area 210 may include a specifying control 211 and a specifying control 212. The terminal device 110 may, in response to receiving a user operation on the specifying control 211, determine that the presentation format of the interaction area 210 is an image format. The terminal device 110 may, in response to receiving a user operation on the specifying control 212, determine that the presentation format of the interaction area 210 is a text format.

For example, the terminal device 110 may, in response to determining that the presentation format specified by the fourth interaction request is the image format, present the data input box in the image format in a first area in the interaction area, and present the tag in the image format in a second area in the interaction area. For example, as shown in FIG. 2B, the presentation format of the interaction area 210 in the example 200B is an image format, and the terminal device 110 may present the data input box 217 in the first area (for example, the area where the data input box 217 is located) of the interaction area 210, and present the tag in the image format in the second area (for example, the area 218). In this way, it is convenient for the user to understand various attributes of the prompt and the corresponding attribute values in a visual manner, thereby supporting the user to determine whether various attribute values specified meet the user requirement.

Figure 2D:
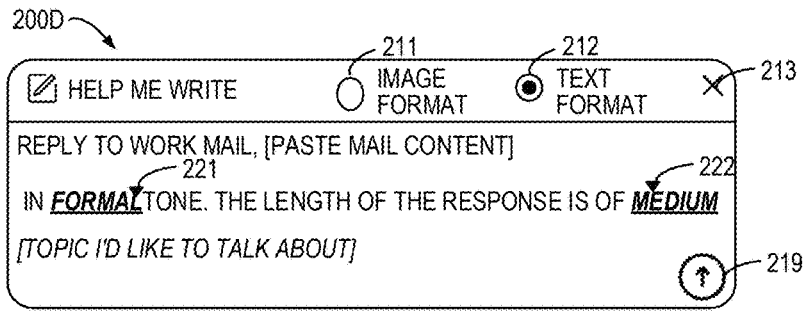

For example, the terminal device 110 may further, in the interaction area, present an initial prompt for performing the task in response to determining that the presentation format specified by the fourth interaction request is a text format, present the data input box in a text format at a first position of the initial prompt, and present the tag in a text format at a second position of the initial prompt. For example, as shown in FIG. 2D, example 200D shows an example of presenting an interaction area in a text format. In Example 200D, an initial prompt "reply to work mail, [paste mail content] in _____ tone. the length of the response is of _____. [topic I'd like to talk about]", and the terminal device 110 may present the data input box in a text format at a first position (e.g., at position of [topic I'd like to talk about]) of the initial prompt, and present the tag in a text format at a second position (e.g., position 221 and position 222) of the initial prompt.

Further, the user may press the triangle symbol shown at position 221 in order to present a plurality of candidate attribute values (e.g., formal, casual, etc.) about tone; the user may press the triangle symbol shown at position 222 in order to present a plurality of candidate attribute values (e.g., long, medium, short, etc.) about the length. In this manner, a complete sentence of the prompt may be presented in a text format, and the specific content of each attribute value may be presented in a highlighted format (e.g., highlighted, bold, italicized, underlined) for further modification or confirmation by the user.

Referring back to FIG. 2B, in some embodiments, the interaction area 210 may further include a submit control 219, the terminal device 110 may, in response to receiving the user operation on the submit control 219, determine the data to be processed based on the data input box 217, and determine the prompt template based on the control 214, the area 215, and the area 218. In some embodiments, the terminal device 110 may present the example 200E shown in FIG. 2E in response to receiving the user operation on the submit control 219. The example 200E illustrates one example of an interaction page. As shown in example 200E, the interaction area 210 may further include a plurality of candidate layouts (for example, the layout 1 to the layout 5 shown in the figure), and each of the plurality of candidate layouts represents a respective layout of response elements in a response to the prompt. The response elements may represent various elements that will appear in the response, e.g., title, body, image, etc. In this way, the layout of the response result may be provided in advance in a visual manner, thereby facilitating the user to select a layout that better meets his/her own needs.

The interaction area 210 may further include a control 231, and the terminal device 110 may present more candidate layouts in response to receiving a user operation for the control 231. The terminal device 110 may, in response to receiving the user operation for a target candidate layout of the plurality of candidate layouts (which may be any one of the plurality of candidate layouts), determine a fifth interaction request for the target candidate layout. The terminal device 110 may, for example, in direct response to receiving a fifth interaction request for the target candidate layout of the plurality of candidate layouts, generate the prompt based on the target candidate layout.

For example, after receiving the fifth interaction request for the target candidate layout of the plurality of candidate layouts, the terminal device 110 may, in response to receiving the user operation for the submit control 219, generate the prompt based on the target candidate layout. In some embodiments, the interaction area 210 may further include an input box 232, and the terminal device 110 may receive input information for the layout from the user via the input box 232, and determine or adjust the target candidate layout based on the received input information. Therefore, this allows the user to preview the response layout, enhances the user's perception of the response result, and facilitates the user to adjust the layout based on the preference of the user.

In some embodiments, the terminal device 110 may, in response to receiving a sixth interaction request for the submit control (for example, receiving a user operation for the submit control 219), further provide the prompt to the model (for example, the model 120). If the model is deployed locally at the terminal device 110, the terminal device 110 may directly provide the prompt to the model and obtain a response to the prompt from the model. If the model is deployed at a server device (e.g., server 130) associated with a conversational interaction application (e.g., application 115), terminal device 110 may submit the prompt to server 130. The server 130 may provide the prompt to the model and obtain the response to the prompt from the model. The terminal device 110 may further obtain the response to the prompt from the server via a communication connection with the server 130. The terminal device 110 may present the response to the prompt from the server 130.

Figure 2E:
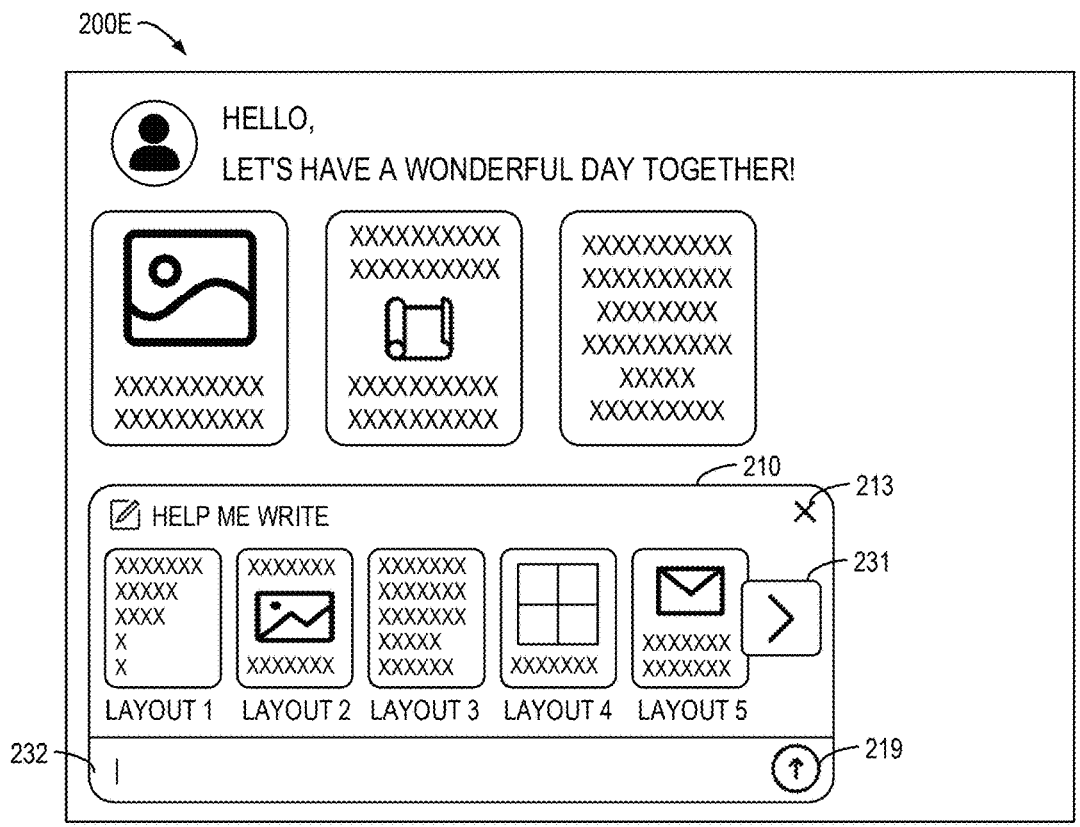
Figure 2F:
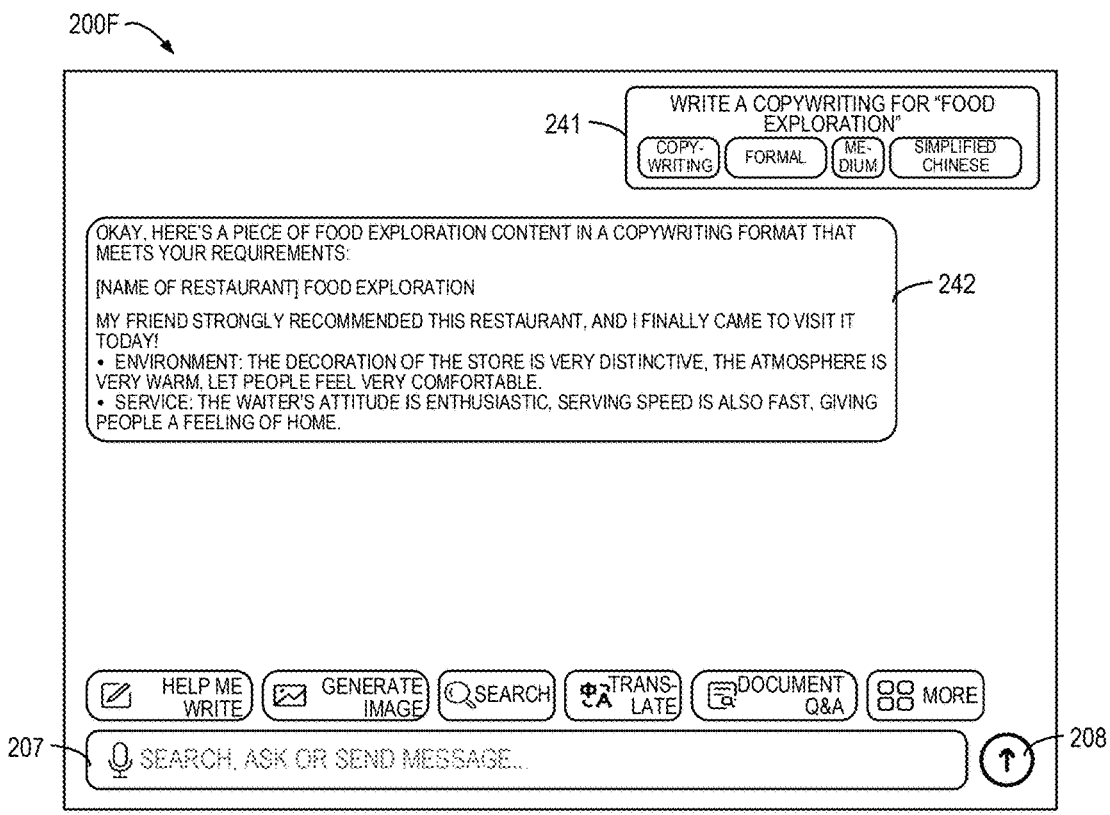

As shown in FIG. 2E and FIG. 2F, example 200F shows an example of the interaction page. The terminal device 110 may, for example, present the example 200F in response to receiving the user operation for the submit control 219 in Example 200E. Terminal device 110 may present a prompt (e.g., session message 241) in the form of session message from a user in example 200F. The session message 241 may include the prompt and a plurality of markers respectively associated with a plurality of attribute values of the plurality of attributes (e.g., the marker "copywriting", the marker "formal", the marker "medium", and the marker "Simplified Chinese" shown in the figure). Terminal device 110 may also present a response to the prompt in the form of session message in the example 200F (e.g., session message 242).

In some embodiments, the terminal device 110 may, in response to receiving the user operation for the target marker (any of the plurality of markers), determine that a seventh interaction request for the target marker is received. The terminal device 110 may, for example, in response to receiving the seventh interaction request for the target marker, present an edit box for editing a target attribute value associated with the target marker, and in response to receiving the seventh interaction request for the edit box, update the target attribute value based on the seventh interaction request to generate an updated prompt. In this way, even after the user has submitted the prompt, the corresponding attribute value can still be modified by clicking the foregoing individual marker, thereby simplifying the complexity of user operation.

Figure 2G:
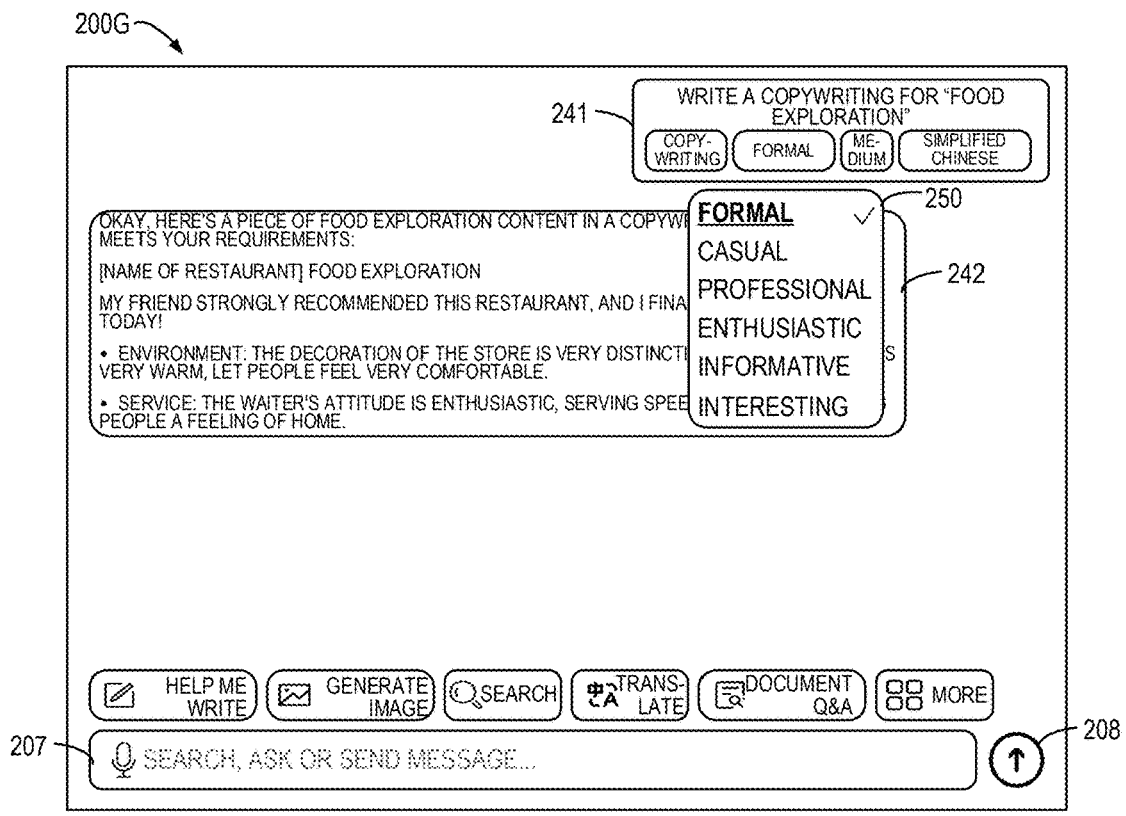

This edit box may be any suitable type of edit box, for example, it may be an input box. The terminal device 110 may receive user input based on the input box, and modify the marker based on the received user input. For example, the edit box may also present a plurality of attribute values that match the attributes corresponding to the markers. For example, as shown in FIG. 2F and FIG. 2G, the terminal device 110 may, in response to receiving a user operation for marker "formal", determine that the seventh interaction request for marker "formal" is received, and then present an edit box 250. The edit box 250 may present a plurality of attribute values associated with the attribute corresponding to the marker "formal". The terminal device 110 may, in response to receiving a selection operation of a certain attribute value of the plurality of attribute values in the edit box 250, modify the attribute value of the attribute corresponding to the marker "formal" to the selected attribute value, and update the marker to a marker corresponding to the attribute value.

Figure 2H:
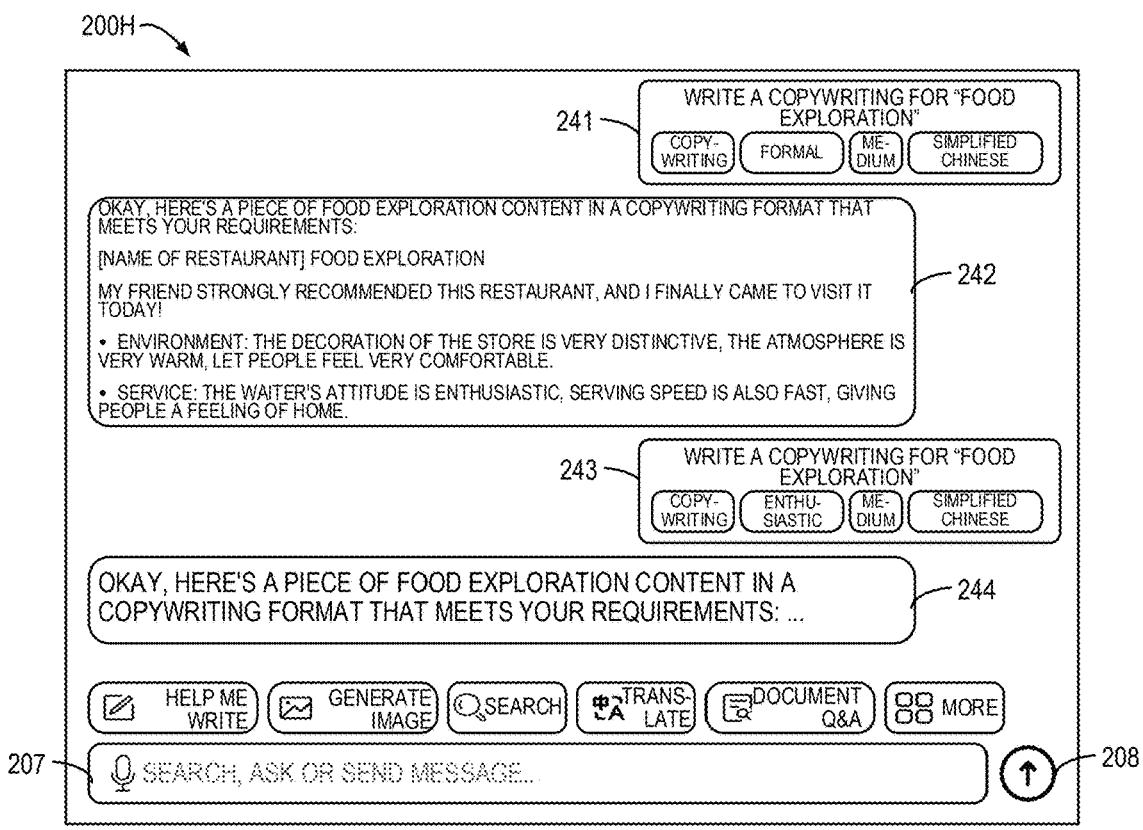

As shown in FIG. 2G and FIG. 2H, if the user selects the attribute value "enthusiastic" in the edit box 250, the terminal device 110 may update the attribute value of the attribute corresponding to the marker "formal" to be "enthusiastic", update the marker, and present the marker "enthusiastic". The terminal device 110 may update the prompt based on the updated attribute value "enthusiastic," and present the session message 243 in example 200H. The session message 243 includes an updated prompt and an updated marker. In some embodiments, the terminal device 110 may further provide the updated prompt to the model to obtain a response to the updated prompt. The terminal device 110 may present the response to the updated prompt. For example, the terminal device 110 may present a session message 244 that includes a response to the updated prompt.

The above describes an exemplary embodiment in which the type of the task is "help me write", it may be understood that if the type is "help me write", the terminal device 110 may generate a prompt indicating that the model generates the text. In addition to the type "help me write", if the type of the task is "generate image", the terminal device 110 may further generate a prompt indicating the content, size, style, and the like of the image, and generate an image based on the prompt by utilizing the model. If the type of the task is "search", the terminal device 110 may further generate a prompt indicating a search keyword, a search engine, and a number of search results, and obtain a search result based on the prompt. In this case, the terminal device 110 may directly provide the prompt to the search engine, or may provide the prompt to the model. If the type of the task is "translate", the terminal device 110 may generate a prompt indicating a source language, a target language, a translation style, and the like. The terminal device 110 may obtain the translation result based on the prompt by utilizing the model.

In summary, according to the embodiments of the present disclosure, the user may customize the prompt conveniently and quickly, the difficulty of inputting the prompt by the user is reduced, the quality of the generated prompt is improved, and the response quality is further improved.

Figure 3:
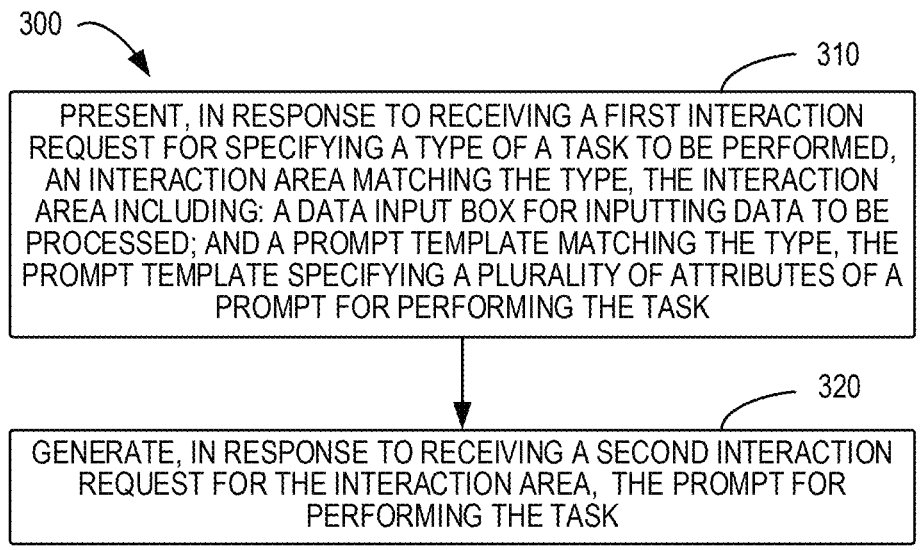
FIG. 3 illustrates a flowchart of a process for prompt determination according to some embodiments of the present disclosure.

FIG. 3 illustrates a flowchart of a process 300 for prompt determination according to some embodiments of the present disclosure. Process 300 may be implemented at terminal device 110. The process 300 is described below with reference to FIG. 1.

At block 310, the terminal device 110 presents, in response to receiving a first interaction request for specifying a type of a task to be performed, an interaction area matching the type, the interaction area including: a data input box for inputting data to be processed; and a prompt template matching the type, the prompt template specifying a plurality of attributes of a prompt for performing the task.

At block 320, the terminal device 110 generates, in response to receiving a second interaction request for the interaction area, the prompt for performing the task.

In some embodiments, generating the prompt includes: determining, in response to determining that the second interaction request is an interaction request for the data input box, the data to be processed based on the second interaction request; setting, in response to determining that the second interaction request is an interaction request for a target attribute of the plurality of attributes, an attribute value of the target attribute based on the second interaction request; and generating the prompt based on the data and the attribute value.

In some embodiments, the target attribute is represented by utilizing a tag, and setting the attribute value based on the second interaction request includes: presenting, in response to determining that the second interaction request is an interaction request for the target attribute, a plurality of candidate attribute values associated with the target attribute; and setting, in response to receiving a third interaction request for a target candidate attribute value of the plurality of candidate attribute values, the attribute value by utilizing the target candidate attribute value.

In some embodiments, the interaction area further includes a specifying control for specifying a presentation format of the interaction area, and the process 300 further includes: presenting, in response to receiving a fourth interaction request for the specifying control, the interaction area by utilizing a presentation format specified by the fourth interaction request.

In some embodiments, presenting the interaction area by utilizing the presentation format specified by the fourth interaction request includes in response to determining that the presentation format specified by the fourth interaction request is an image format: presenting the data input box in the image format in a first area of the interaction area; and presenting the tag in the image format in a second area of the interaction area.

In some embodiments, presenting the interaction area by utilizing the presentation format specified by the fourth interaction request includes in response to determining that the presentation format specified by the fourth interaction request is a text format: presenting an initial prompt for performing the task in the interaction area; presenting the data input box in the text format at a first position of the initial prompt; and presenting the tag in the text format at a second position of the initial prompt.

In some embodiments, the interaction area further includes a plurality of candidate layouts, each of the plurality of candidate layouts represents a respective layout of response element in a response to the prompt, and the process 300 further includes: generating, in response to receiving a fifth interaction request for a target candidate layout of the plurality of candidate layouts, the prompt based on the target candidate layout.

In some embodiments, the process 300 is implemented in a conversational interaction application, and the interaction area further includes a submit control for submitting the prompt, and the process 300 further includes: submitting, in response to receiving a sixth interaction request for the submit control, the prompt to a server device associated with the conversational interaction application; and presenting a response from the server device for the prompt.

In some embodiments, the process 300 further includes: presenting, in response to receiving the sixth interaction request for the submit control, in the conversational interaction application, the prompt and a plurality of markers respectively associated with a plurality of attribute values of the plurality of attributes.

In some embodiments, the process 300 further includes: presenting, in response to receiving a seventh interaction request for a target marker of the plurality of markers, an edit box for editing a target attribute value associated with the target marker; and updating, in response to receiving the seventh interaction request for the edit box, the target attribute value based on the seventh interaction request to generate an updated prompt.

In some embodiments, the process 300 further includes: presenting a response from the server device for the updated prompt.

Figure 4:
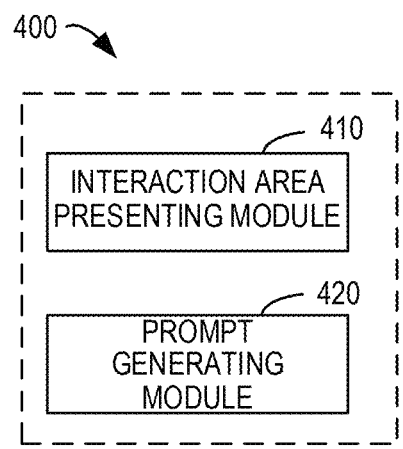
FIG. 4 illustrates a block diagram of an apparatus for prompt determination according to some embodiments of the present disclosure.

According to some embodiments of the present disclosure, an apparatus for prompt determination is further provided. FIG. 4 illustrates a block diagram of an apparatus 400 for prompt determination according to some embodiments of the present disclosure. The apparatus 400 may be implemented as or included in the terminal device 110. The various modules/components in the apparatus 400 may be implemented by hardware, software, firmware, or any combination thereof.

As shown in FIG. 4, the apparatus 400 includes an interaction area presenting module 410 configured to present, in response to receiving a first interaction request for specifying a type of a task to be performed, an interaction area matching the type, the interaction area including: a data input box for inputting data to be processed; and a prompt template matching the type, the prompt template specifying a plurality of attributes of a prompt for performing the task. The apparatus 400 further includes a prompt generating module 420 configured to generate, in response to receiving a second interaction request for the interaction area, the prompt for performing the task.

In some embodiments, the prompt generating module 420 includes: a data determining module configured to determine, in response to determining that the second interaction request is an interaction request for the data input box, the data to be processed based on the second interaction request; an attribute value determining module configured to set, in response to determining that the second interaction request is an interaction request for a target attribute of the plurality of attributes, an attribute value of the target attribute based on the second interaction request; and a first prompt generating module configured to generate the prompt based on the data and the attribute value.

In some embodiments, the target attribute is represented by utilizing a tag, and the attribute value determining module includes: an attribute value presenting module, configured to present, in response to determining that the second interaction request is an interaction request for the target attribute, a plurality of candidate attribute values associated with the target attribute; and an attribute value setting module, configured to set, in response to receiving a third interaction request for a target candidate attribute value of the plurality of candidate attribute values, the attribute value by utilizing the target candidate attribute value.

In some embodiments, the interaction area further includes a specifying control for specifying a presentation format of the interaction area, and the apparatus 400 further includes: a first area presenting module, configured to present, in response to receiving a fourth interaction request for the specifying control, the interaction area by utilizing a presentation format specified by the fourth interaction request.

In some embodiments, the first area presenting module includes: a first input box presenting module configured to present, in response to determining that the presentation format specified by the fourth interaction request is an image format, the data input box in the image format in a first area of the interaction area; and a first tag presenting module configured to present the tag in the image format in a second area of the interaction area.

In some embodiments, the first area presenting module includes: an initial prompt presenting module configured to present, in response to determining that the presentation format specified by the fourth interaction request is a text format, an initial prompt for performing the task in the interaction area; a second input box presenting module configured to present the data input box in the text format at a first position of the initial prompt; and a second tag presenting module configured to present the tag in the text format at a second position of the initial prompt.

In some embodiments, the interaction area further includes a plurality of candidate layouts, each of the plurality of candidate layouts represents a respective layout of response element in a response to the prompt, and the apparatus 400 further includes: a second prompt generating module configured to generate, in response to receiving a fifth interaction request for a target candidate layout of the plurality of candidate layouts, the prompt based on the target candidate layout.

In some embodiments, the apparatus 400 is implemented in a conversational interaction application, and the interaction area further includes a submit control for submitting the prompt, and the apparatus 400 further includes: a prompt submit module configured to submit, in response to receiving a sixth interaction request for the submit control, the prompt to a server device associated with the conversational interaction application; and a first response presenting module configured to present a response from the server device for the prompt.

In some embodiments, the apparatus 400 further includes: a presenting module configured to present, in response to receiving the sixth interaction request for the submit control, in the conversational interaction application, the prompt and a plurality of markers respectively associated with a plurality of attribute values of the plurality of attributes.

In some embodiments, the apparatus 400 further includes: an edit box presenting module configured to present, in response to receiving a seventh interaction request for a target marker of the plurality of markers, an edit box for editing a target attribute value associated with the target marker; and a prompt updating module configured to update, in response to receiving the seventh interaction request for the edit box, the target attribute value based on the seventh interaction request to generate an updated prompt.

In some embodiments, the apparatus 400 further includes: a second response presenting module configured to present a response from the server device for the updated prompt.

The units and/or modules included in the apparatus 400 may be implemented in various manners, including software, hardware, firmware, or any combination thereof. In some embodiments, one or more units and/or modules may be implemented using software and/or firmware, such as machine-executable instructions stored on a storage medium. In addition to or as an alternative to the machine-executable instructions, some or all of the units and/or modules in the apparatus 400 may be implemented, at least in part, by one or more hardware logic components. As an example and not a limitation, exemplary types of hardware logic components that may be used include field programmable gate arrays (FPGAs), application specific integrated circuits (ASICs), application specific standard products (ASSPs), system-on-a-chip (SOCs), complex programmable logic devices (CPLDs), and the like.

It should be understood that one or more of steps in the above methods may be performed by an appropriate electronic device or a combination of electronic devices. Such an electronic device or a combination of electronic devices may include, for example, the terminal device 110 in FIG. 1.

Figure 5:
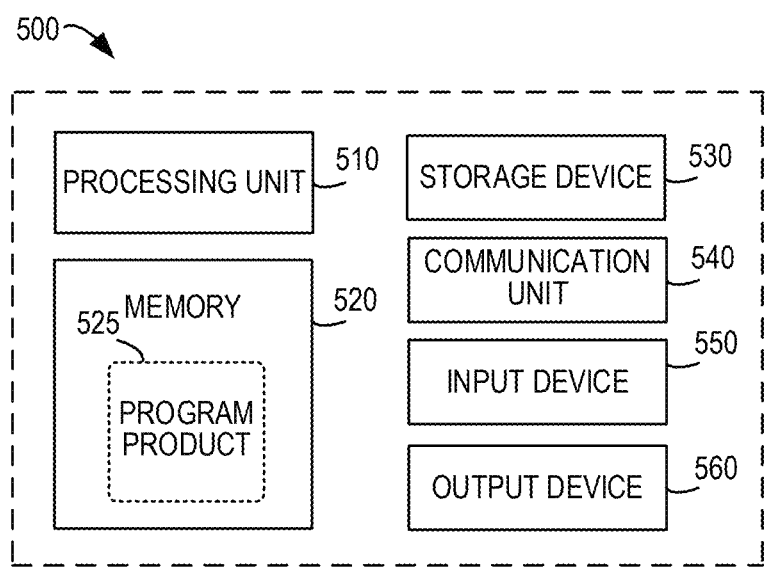
FIG. 5 illustrates a block diagram of an electronic device in which one or more embodiments of the present disclosure may be implemented.

FIG. 5 illustrates a block diagram of an electronic device 500 in which one or more embodiments of the present disclosure may be implemented. It should be understood that the electronic device 500 shown in FIG. 5 is merely exemplary and should not constitute any limitation on the functionality and scope of the embodiments described herein.

The electronic device 500 shown in FIG. 5 may be used to implement the terminal device 110 of FIG. 1 and/or the device 400 of FIG. 4.

As shown in FIG. 5, the electronic device 500 is in the form of a general-purpose computing device. Components of the electronic device 500 may include, but are not limited to, one or more processors or processing units 510, a memory 520, a storage device 530, one or more communication units 540, one or more input devices 550, and one or more output devices 560. The processing unit 510 may be an actual or virtual processor and capable of performing various processes according to programs stored in the memory 520. In multiprocessor systems, multiple processing units execute computer-executable instructions in parallel to improve parallel processing capabilities of electronic device 500.

The electronic device 500 typically includes a plurality of computer storage media. Such media may be any available media accessible by the electronic device 500, including, but not limited to, volatile and non-volatile media, removable and non-removable media. The memory 520 may be volatile memory (e.g., a register, a cache, a random access memory (RAM)), a non-volatile memory (e.g., read-only memory (ROM), an electrically erasable programmable read-only memory (EEPROM), flash memory), or some combination thereof. Storage device 530 may be a removable or non-removable medium and may include a machine-readable medium, such as a flash drive, a magnetic disk, or any other medium, which may be used to store information and/or data and may be accessed within electronic device 500.

The electronic device 500 may further include additional removable/non-removable, volatile/non-volatile storage media. Although not shown in FIG. 5, a disk drive for reading from or writing to a removable, nonvolatile magnetic disk (e.g., a "floppy disk") and an optical disk drive for reading from or writing to a removable, nonvolatile optical disk may be provided. In these cases, each drive may be connected to a bus (not shown) by one or more data media interfaces. The memory 520 may include a computer program product 525 having one or more program modules configured to perform various methods or actions of various implementations of the present disclosure.

The communications unit 540 implements communications with other computing devices over a communications medium. Additionally, the functionality of components of the electronic device 500 may be implemented in a single computing cluster or multiple computing machines capable of communicating over a communication connection. Thus, the electronic device 500 may operate in a networked environment using logical connections to one or more other servers, network personal computers (PCs), or another network node.

The input device 550 may be one or more input devices such as a mouse, a keyboard, a trackball, or the like. The output device 560 may be one or more output devices, such as a display, a speaker, a printer, or the like. The electronic device 500 may also communicate with one or more external devices (not shown) such as a storage device, a display device, or the like through the communication unit 540 as needed, and communicate with one or more devices that enable a user to interact with the electronic device 500, or communicate with any device (e.g., a network card, a modem, etc.) that enables the electronic device 500 to communicate with one or more other computing devices. Such communication may be performed via an input/output (I/O) interface (not shown).

According to example implementations of the present disclosure, there is provided a computer-readable storage medium having computer-executable instructions stored thereon, wherein the computer-executable instructions are executed by a processor to implement the method described above. According to exemplary implementations of the present disclosure, a computer program product is further provided, the computer program product is tangibly stored on a non-transitory computer-readable medium and includes computer-executable instructions, and the computer-executable instructions are executed by a processor to implement the method described above.

Aspects of the present disclosure are described herein with reference to flowcharts and/or block diagrams of methods, apparatuses, devices, and computer program products implemented in accordance with the present disclosure. It should be understood that each block of the flowcharts and/or block diagrams, and combinations of blocks in the flowcharts and/or block diagrams, may be implemented by computer readable program instructions.

These computer-readable program instructions may be provided to a processor of a general purpose computer, special purpose computer, or other programmable data processing apparatus to produce a machine, such that the instructions, when executed by a processor of a computer or other programmable data processing apparatus, create means for implementing the functions/actions specified in one or more blocks of the flowchart and/or block diagram. These computer-readable program instructions may also be stored in a computer-readable storage medium that can direct a computer, a programmable data processing apparatus, and/or other devices to function in a particular manner, such that the computer-readable medium storing instructions includes an article of manufacture including instructions which implement various aspects of the functions/actions specified in one or more blocks of the flowchart and/or block diagram(s).

The computer-readable program instructions may be loaded onto a computer, other programmable data processing apparatus, or other apparatus, such that a series of operational steps are performed on a computer, other programmable data processing apparatus, or other apparatus to produce a computer-implemented process such that the instructions executed, when being executed on a computer, other programmable data processing apparatus, or other devices, implement the functions/actions specified in one or more blocks of the flowchart and/or block diagram.

The flowcharts and block diagrams in the drawings illustrate the architecture, functionality, and operations of possible implementations of systems, methods, and computer program products according to various implementations of the present disclosure. In this regard, each block in the flowchart or block diagram may represent a module, program segment, or a portion of an instruction that includes one or more executable instructions for implementing the specified logical function. In some alternative implementations, the functions marked in the blocks may also occur in a different order than those marked in the figures. For example, two consecutive blocks may actually be performed in parallel, or they may sometimes be performed in reverse order, depending on the function involved. It should also be noted that each block in the block diagrams and/or flowchart, as well as combinations of blocks in the block diagrams and/or flowchart, may be implemented using a dedicated hardware-based system that performs the specified functions or actions, or may be implemented using a combination of dedicated hardware and computer instructions.

Various implementations of the present disclosure have been described above, the foregoing description is exemplary, not exhaustive, and the present disclosure is not limited to the implementations as disclosed. Many modifications and variations will be apparent to those of ordinary skill in the art without departing from the scope and spirit of the implementations as described. The selection of the terms used herein is intended to best explain the principles of the implementations, practical applications, or improvements to techniques in the marketplace, or to enable those skilled in the art to understand the various implementations disclosed herein.

What is claimed is:

1. A method for prompt determination, comprising:
presenting, in response to receiving a first interaction request for specifying a type of a task to be performed, an interaction area matching the type, the interaction area comprising:
    a data input box for inputting data to be processed;
    a plurality of tags for specifying a plurality of attributes of a prompt for performing the task;
    a prompt template matching the type, the prompt template specifying the prompt for performing the task based on the plurality of attributes; and
generating, in response to receiving a second interaction request for the interaction area, the prompt for performing the task.

2. The method of claim 1, wherein generating the prompt comprises:
determining, in response to determining that the second interaction request is an interaction request for the data input box, the data to be processed based on the second interaction request;
setting, in response to determining that the second interaction request is an interaction request for a target attribute of the plurality of attributes, an attribute value of the target attribute based on the second interaction request; and
generating the prompt based on the data and the attribute value.

3. The method of claim 2, wherein the target attribute is represented by utilizing a tag in the plurality of tags, and setting the attribute value based on the second interaction request comprises:
presenting, in response to determining that the second interaction request is an interaction request for the target attribute, a plurality of candidate attribute values associated with the target attribute; and
setting, in response to receiving a third interaction request for a target candidate attribute value of the plurality of candidate attribute values, the attribute value by utilizing the target candidate attribute value.

4. The method of claim 3, wherein the interaction area further comprises a specifying control for specifying a presentation format of the interaction area, and the method further comprises: presenting, in response to receiving a fourth interaction request for the specifying control, the interaction area by utilizing a presentation format specified by the fourth interaction request.

5. The method of claim 4, wherein presenting the interaction area by utilizing the presentation format specified by the fourth interaction request comprises in response to determining that the presentation format specified by the fourth interaction request is an image format:
presenting the data input box in the image format in a first area of the interaction area; and
presenting the tag in the image format in a second area of the interaction area.

6. The method of claim 4, wherein presenting the interaction area by utilizing the presentation format specified by the fourth interaction request comprises in response to determining that the presentation format specified by the fourth interaction request is a text format:
presenting an initial prompt for performing the task in the interaction area;
presenting the data input box in the text format at a first position of the initial prompt; and
presenting the tag in the text format at a second position of the initial prompt.

7. The method of claim 1, wherein the interaction area further comprises a plurality of candidate layouts, each of the plurality of candidate layouts represents a respective layout of response elements in a response to the prompt, and the method further comprises: generating, in response to receiving a fifth interaction request for a target candidate layout of the plurality of candidate layouts, the prompt based on the target candidate layout.

8. The method of claim 1, wherein the method is implemented in a conversational interaction application, and the interaction area further comprises a submit control for submitting the prompt, and the method further comprises:
submitting, in response to receiving a sixth interaction request for the submit control, the prompt to a server device associated with the conversational interaction application; and
presenting a response from the server device for the prompt.

9. The method of claim 8, further comprising: presenting, in response to receiving the sixth interaction request for the submit control, in the conversational interaction application, the prompt and a plurality of markers respectively associated with a plurality of attribute values of the plurality of attributes.

10. The method of claim 9, further comprising:
presenting, in response to receiving a seventh interaction request for a target marker of the plurality of markers, an edit box for editing a target attribute value associated with the target marker; and
updating, in response to receiving the seventh interaction request for the edit box, the target attribute value based on the seventh interaction request to generate an updated prompt.

11. The method of claim 10, further comprising: presenting a response from the server device for the updated prompt.

12. An electronic device, comprising:
at least one processor; and
at least one memory coupled to the at least one processor and storing instructions for execution by the at least one processor, the instructions, when executed by the at least one processor, causing the electronic device to perform acts comprising:
presenting, in response to receiving a first interaction request for specifying a type of a task to be performed, an interaction area matching the type, the interaction area comprising:
    a data input box for inputting data to be processed;
    a plurality of tags for specifying a plurality of attributes of a prompt for performing the task;

a prompt template matching the type, the prompt template specifying the prompt for performing the task based on the plurality of attributes; and generating, in response to receiving a second interaction request for the interaction area, the prompt for performing the task.

13. The electronic device of claim 12, wherein generating the prompt comprises:

determining, in response to determining that the second interaction request is an interaction request for the data input box, the data to be processed based on the second interaction request;

setting, in response to determining that the second interaction request is an interaction request for a target attribute of the plurality of attributes, an attribute value of the target attribute based on the second interaction request; and generating the prompt based on the data and the attribute value.

14. The electronic device of claim 13, wherein the target attribute is represented by utilizing a tag in the plurality of tags, and setting the attribute value based on the second interaction request comprises:

presenting, in response to determining that the second interaction request is an interaction request for the target attribute, a plurality of candidate attribute values associated with the target attribute; and setting, in response to receiving a third interaction request for a target candidate attribute value of the plurality of candidate attribute values, the attribute value by utilizing the target candidate attribute value.

15. The electronic device of claim 14, wherein the interaction area further comprises a specifying control for specifying a presentation format of the interaction area, and the acts further comprise: presenting, in response to receiving a fourth interaction request for the specifying control, the interaction area by utilizing a presentation format specified by the fourth interaction request.

16. The electronic device of claim 15, wherein presenting the interaction area by utilizing the presentation format specified by the fourth interaction request comprises in response to determining that the presentation format specified by the fourth interaction request is an image format:

presenting the data input box in the image format in a first area of the interaction area; and presenting the tag in the image format in a second area of the interaction area.

17. The electronic device of claim 15, wherein presenting the interaction area by utilizing the presentation format specified by the fourth interaction request comprises in response to determining that the presentation format specified by the fourth interaction request is a text format:

presenting an initial prompt for performing the task in the interaction area;

presenting the data input box in the text format at a first position of the initial prompt; and presenting the tag in the text format at a second position of the initial prompt.

18. The electronic device of claim 12, wherein the interaction area further comprises a plurality of candidate layouts, each of the plurality of candidate layouts represents a respective layout of response elements in a response to the prompt, and the acts further comprise: generating, in response to receiving a fifth interaction request for a target candidate layout of the plurality of candidate layouts, the prompt based on the target candidate layout.

19. A non-transitory computer-readable storage medium having stored thereon a computer program executable by a processor to implement acts comprising:

presenting, in response to receiving a first interaction request for specifying a type of a task to be performed, an interaction area matching the type, the interaction area comprising:

a data input box for inputting data to be processed;

a plurality of tags for specifying a plurality of attributes of a prompt for performing the task;

a prompt template matching the type, the prompt template specifying the prompt for performing the task based on the plurality of attributes; and generating, in response to receiving a second interaction request for the interaction area, the prompt for performing the task.

20. The non-transitory computer-readable storage medium of claim 19, wherein generating the prompt comprises:

determining, in response to determining that the second interaction request is an interaction request for the data input box, the data to be processed based on the second interaction request;

setting, in response to determining that the second interaction request is an interaction request for a target attribute of the plurality of attributes, an attribute value of the target attribute based on the second interaction request; and generating the prompt based on the data and the attribute value.

* * * * *